June 26, 1951     G. B. HILL ET AL     2,558,250

BALING PRESS, ESPECIALLY BALE CASE CONSTRUCTION

Filed May 3, 1948     4 Sheets-Sheet 1

INVENTORS
G. B. HILL
M. E. McCLELLAN
BY
ATTORNEYS

June 26, 1951 G. B. HILL ET AL 2,558,250
BALING PRESS, ESPECIALLY BALE CASE CONSTRUCTION
Filed May 3, 1948 4 Sheets-Sheet 2
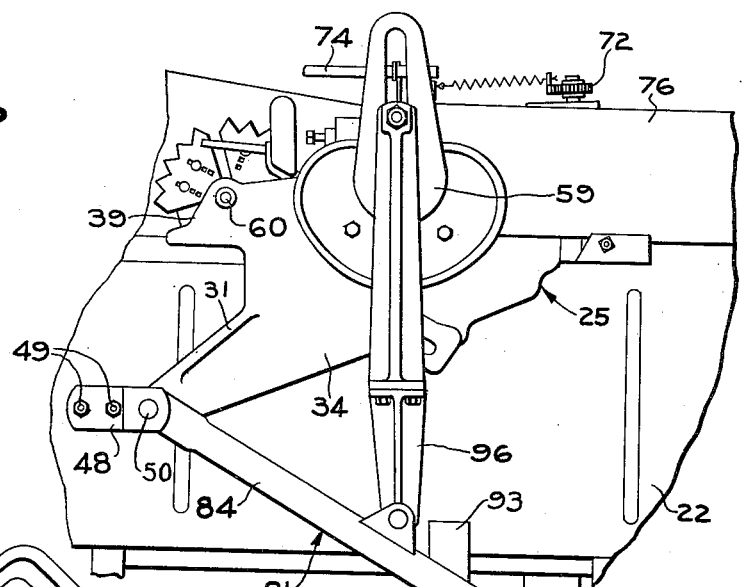
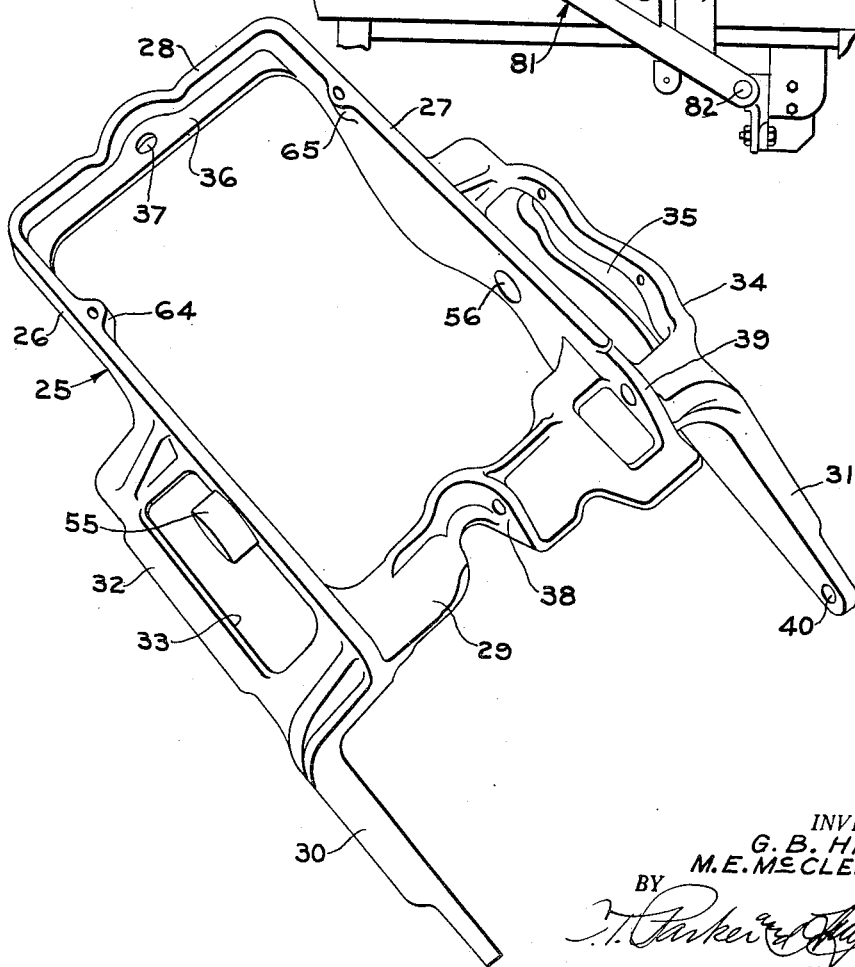
INVENTORS
G. B. HILL
M. E. McCLELLAN
BY
ATTORNEYS

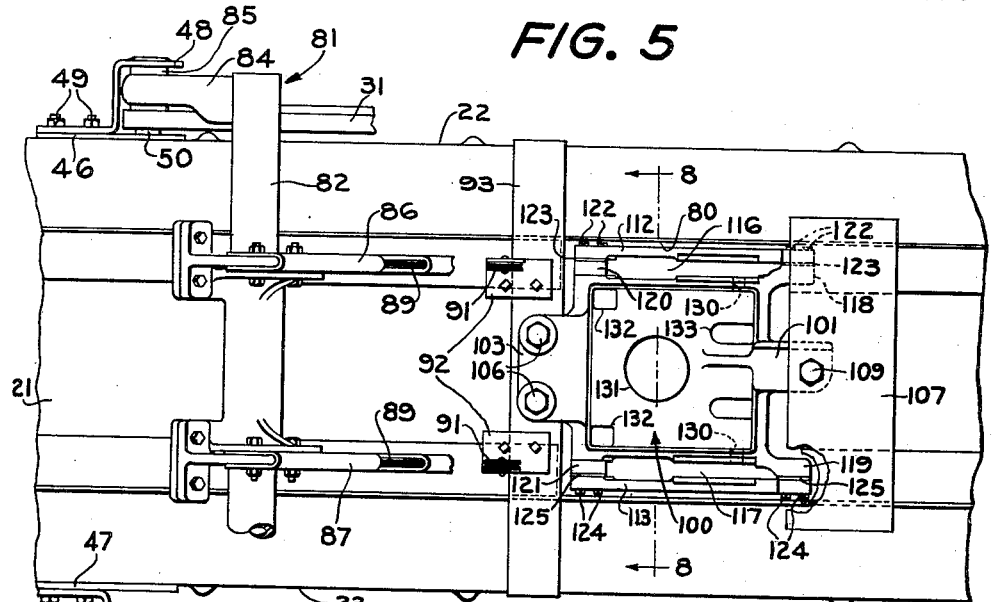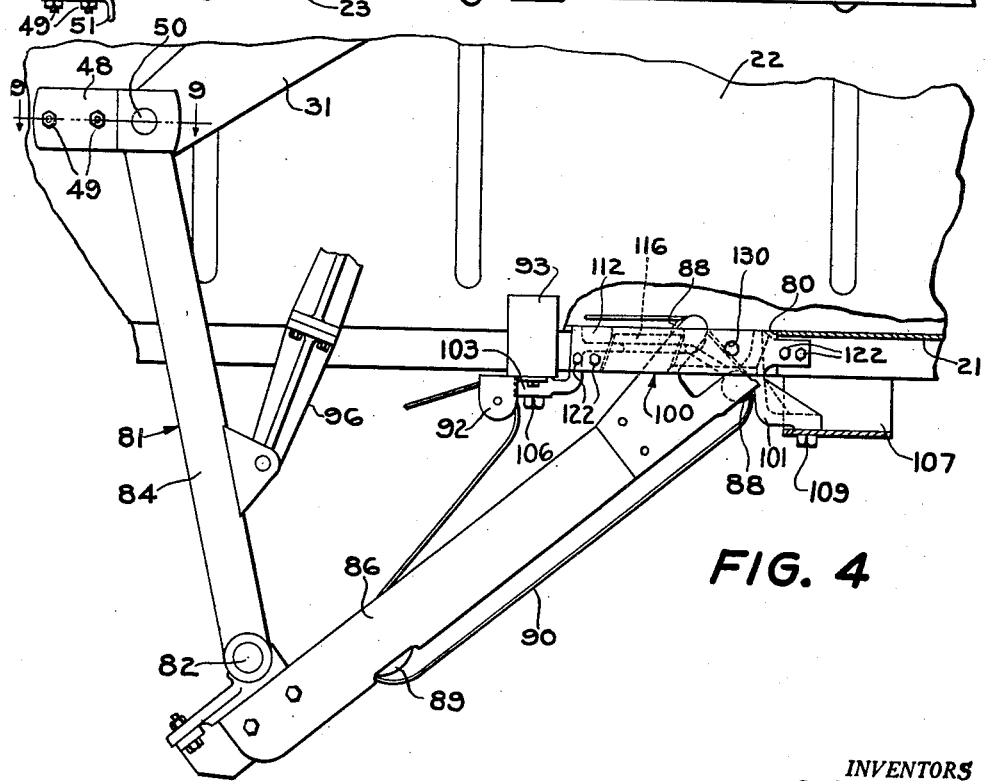

June 26, 1951 G. B. HILL ET AL 2,558,250
BALING PRESS, ESPECIALLY BALE CASE CONSTRUCTION
Filed May 3, 1948 4 Sheets-Sheet 4
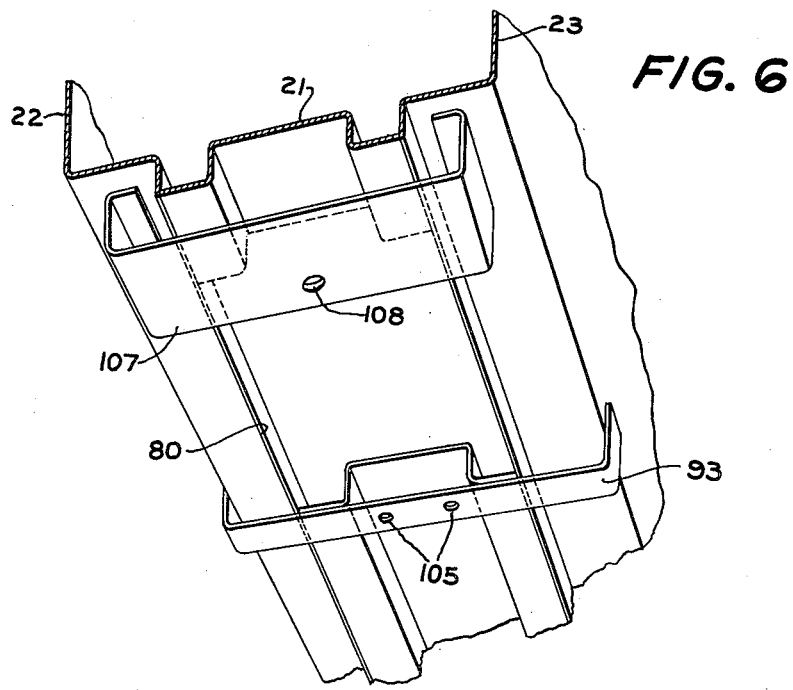
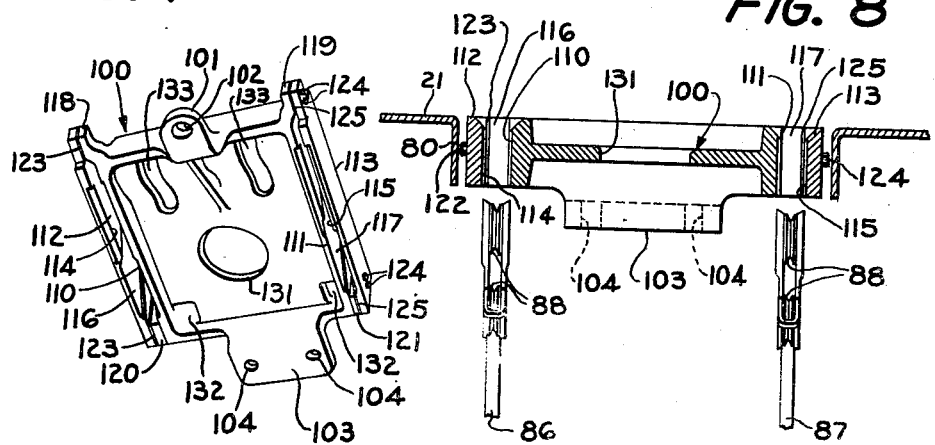
INVENTORS
G. B. HILL
M. E. McCLELLAN
BY
ATTORNEYS Patented June 26, 1951

2,558,250

UNITED STATES PATENT OFFICE 2,558,250

BALING PRESS, ESPECIALLY BALE CASE CONSTRUCTION

George B. Hill and Marcus E. McClellan, Ottumwa, Iowa, assignors to Deere Manufacturing Co., Dubuque, Iowa, a corporation of Iowa Application May 3, 1948, Serial No. 24,894

19 Claims. (Cl. 100—19)

This invention relates to a baling press or the like and more particularly to improvements in the bale case to prevent malfunctioning of certain of the baler parts because of distortion of the bale case.

The usual baler is most economically constructed on the basis of a design including an elongated bale case made up of a plurality of sheet metal walls defining a generally rectangular chamber in which a plunger reciprocates to form bales of the material being handled. Ordinarily, the top wall of the bale case carries tying mechanism and a needle is carried by the bale case for movement into, and out of an opening through the bottom wall of the bale case for handling a tying medium, such as wire or twine, which is caused to enter the bale case through the bottom opening and through an opening in the top wall proximate to the tying mechanism. The tying mechanism and needle must be appropriately timed with the baling plunger and with each other so that the tying operation is effected at proper intervals in accordance with the quantity of material in the bale case and in relation to the functions of other parts of the baling mechanism. Because of the generally flexible nature of the bale case, it often happens that cooperating parts of the tying mechanism, including the needle, become misaligned, especially when the baler is of the pickup type and is moved over uneven ground, in which case it will be appreciated that the distortion of the bale case has an adverse effect on the tying mechanism, particularly on the needle, which in many cases is jammed in its guide slot, or the twine or wire that it is feeding slips out of the guiding rollers and becomes wedged between portions of the needle and portions of the bale case. It will further be appreciated that the foregoing malfunctioning is a constant source of annoyance to the operator and results in numerous break downs and considerable loss of time.

According to the present invention, it is proposed to eliminate the disadvantages by the provision of an improved bale case structure embodying rigid supporting elements for the tying mechanism components. Particularly, it is an important object of the invention to provide a unitary rigid support for the tying mechanism which is preferably in the form of a casting having generally a saddle-like construction provided with rigidly joined parts securable to related walls of the bale case in such manner as to reenforce the bale case in the vicinity of the tying mechanism, thereby eliminating distortion of the case at that point. A related object has to do with the provision on such support of means for mounting the tying mechanism independently of the bale case, so that flexing or distortion of the bale case will not be carried to the tying mechanism. It is a further related object to mount the tying needle on such support.

Inasmuch as prior constructions depend upon structural parts of the bale case itself to define the guide slots through which the tying needle travels, it will be readily understood that distortion or flexing of the case would naturally affect the guide slots to such an extent that the slots allowed the wire or twine to escape from the needle. It is an important object of the present invention to provide a rigid needle guide having slots defined by relatively rigid portions that will not be affected by flexing or distortion of the bale case and which consequently will not interfere with proper operation of the needle and proper feeding of the wire or twine. A related object of the invention pertains to the provision on such support of mounting means whereby the support may be easily attached to the bale case.

The invention contemplates further the provision in a bale case structure of a pair of rigid supports of the type referred to and related in such manner in the bale case structure as to reenforce and rigidify the portion of the bale case in which the tying operation takes place. In order that the rigidity afforded by the supports does not altogether eliminate desirable flexing of the bale case, the invention includes the features based on the design of the supports in such manner that they may be secured to the bale case at relatively few points, certain of the supporting connections being in the form of single mounting elements providing for flexing of the case without transmission of the torsional deflection of the case to the support, thus eliminating the danger of breakage of the support.

The foregoing and other important objects and desirable features inherent in and encompassed by the invention will become apparent as the disclosure of a preferred embodiment of the invention is made in detail in the following description and accompanying sheets of drawings, in which Figure 1 is a fragmentary perspective view showing the upper intermediate portion of the bale case of one well known type of baling press;

Figure 2 is a side elevational fragmentary view of the same portion of the bale case;

Figure 3 is a perspective view showing the upper support removed from the structure of Figure 1;

Figure 4 is a side elevational view of the lower portion of the structure shown in Figure 2, on a slightly enlarged scale, showing the tying needle in a lower position;

Figure 5 is a bottom plan view of the structure shown in Figure 4, certain parts being broken away to clarify the illustration;

Figure 6 is a perspective view of a portion of the bottom of the bale case showing the opening for the needle guide support;

Figure 7 is a perspective view of the needle guide support as adapted to the structure of Figure 6;

Figure 8 is a transverse sectional view on a slightly enlarged scale, taken on the line 8—8 of Figure 5.

Since the general constructions of baling presses are well known to those skilled in the art, the present disclosure illustrates only that portion of the bale case of one type of well known baler with which the invention is immediately concerned. It should be understood, however, that the principles of the invention, with slight modifications or alterations, may be readily applied to balers of any type.

Figure 1:
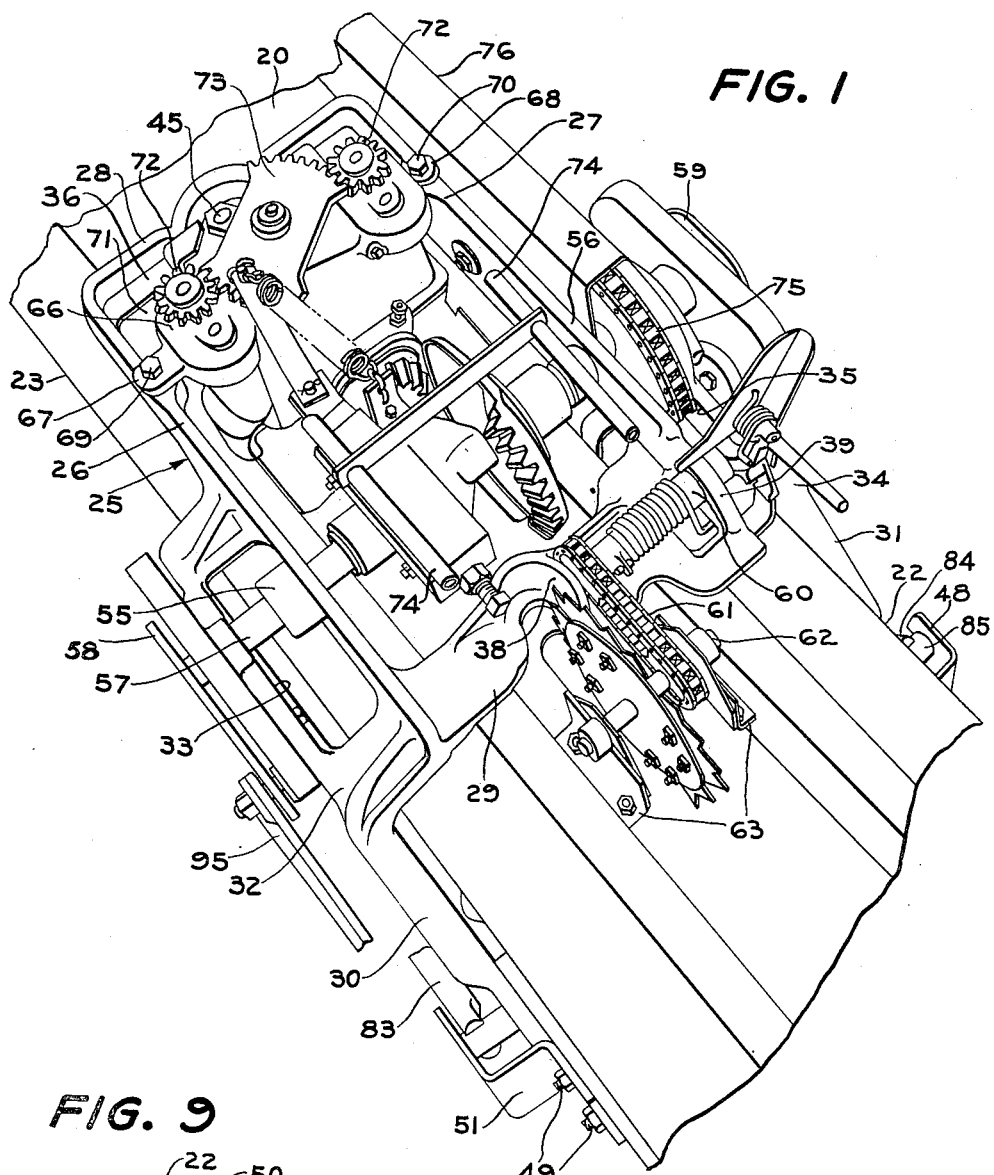

As best seen in Figures 1, 4 and 5, the bale case is of elongated character and is generally rectangular in cross section, having four walls preferably constructed of sheet metal and arranged to form the rectangular baling chamber, the walls being indicated generally as a top wall 20 (Figure 1), a bottom wall 21 (Figure 6), and opposite side walls 22 and 23. The interior of the case is thus in the form of a chamber to which material is fed to be compressed into bales by a reciprocating plunger (not shown) in the usual manner.

According to the invention there is provided a first support, designated generally by the numeral 25 and shown by itself in Figure 3. This support is preferably in the form of a casting so that it provides a rigid unitary structure and is shaped generally as a saddle, the details of which will presently appear. The upper portion of the member 25 is of open construction which provides a rigid generally rectangular frame structure made up of a pair of opposite generally parallel side elements 26 and 27 and a pair of transverse end elements 28 and 29. That part of the member 25 comprising the elements 26, 27, 28 and 29 provides an upper transverse part which is adapted to be disposed transversely across the top wall 20 of the bale case (Figure 1). The member 25 further includes a pair of depending parts in the form of arm portions 30 and 31 respectively rigidly joined to and depending from the side elements 26 and 27. The junction between the side element 26 and the depending arm portion 30 is enlarged or reenforced at 32 to reenforce the structure generally and to accommodate the provision of a recess or pocket 33. The opposite side of the structure is similarly provided with a reenforcement or second portion 34 which has a pocket or recess 35. The end element 28 is flanged at 36 and this flange is provided with a mounting aperture 37, the purpose of which will presently appear. The transverse or end element 29 is provided with an intermediately disposed upstanding apertured ear 38 which provides a supporting or bearing portion in transverse alignment with an apertured ear 39 which extends substantially as a continuation of the side element 28 substantially at the junction between that element and the depending arm portion 31. Each of the lower portions of the depending arms 30 and 31 is apertured, only the aperture in the arm 31 being visible at 40 in Figure 3.

The member 25 is mounted on the top of the bale case with the side elements 26 and 27 respectively paralleling the bale case side walls 23 and 22 and with the end elements 28 and 29 lying transversely across the top wall 20; the side parts or arm portions 30 and 31 depend respectively alongside the side walls 23 and 22 (Figures 1 and 2). The upper or transverse part of the member 25 is secured to the bale case preferably by means of a single point of connection between the member and the bale case top wall 20, a bolt and nut 45 being used for this purpose, the bolt passing through the aperture 37 in the flange 36 on the end element 28 (Figures 1 and 3).

Figure 9:
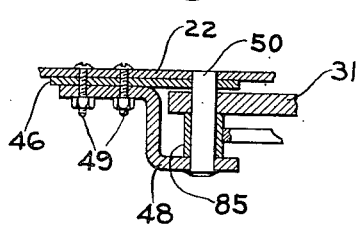
Figure 9 is a fragmentary sectional view taken substantially on the line 9—9 of Figure 4 and illustrating the manner of mounting the needle structure and the upper support on the side wall of the bale case.

As best shown in Figures 5 and 9, the side wall portions 22 and 23 are reinforced respectively at 46 and 47 by means of a short longitudinal strip preferably secured to the bale case walls by welding. The reenforcing strip 46 is proximate to the lower end of the depending arm portion 31 and serves as part of a mounting means, including a bracket 48, for connecting the arm 31 to the bale case wall 22. As best shown in Figure 9, the bracket 48 is generally in the form of a Z having an apertured flange through which bolts 49 are passed for securing the bracket to the bale case wall, the bale case wall and reenforcing strip 46 being appropriately apertured in alignment to receive these bolts. The bracket 48 carries a mounting pin 50 which passes through the aperture 40 in the arm 31 and thence into aligned apertures in the reenforcing strip 46 and the proximate portion of the bale case wall 22. The pin 50 is preferably welded at its outer end to one of the flanges of the bracket 48 and the bracket and pin may be considered a unitary element for the purposes of assembly and disassembly, removal of the bolts 49 permitting removal of the bracket 48 and withdrawal of the pin 50 from the arm 31. The other arm 30 is connected to the other bale case side wall 23 by similar means, indicated in its entirety by the numeral 51 in Figure 1. The member 25 is thus carried by the bale case at the three points 45, 50 and 51 and these means serve to carry the member 25 so that it may be easily removed and installed.

When the member 25 is in place on the bale case it becomes a structural part of the bale case and serves as means for carrying the baler tying mechanism, as best shown in Figures 1 and 2. It will be understood, of course, that any type of tying mechanism may be carried on the saddle member 25 and the details of the mechanism illustrated form no part of the present invention. A comparison of Figures 1 and 3 will illustrate the manner in which the tying mechanism is carried by the saddle member independently of any support on the bale case, with the exception of minor elements the operation of which is not adversely affected by flexing of the bale case. The side elements 26 and 27 are provided respectively with bearing portions 55 and 56 for carrying a transverse shaft 57 which operates the tying mechanism. This shaft extends respectively at opposite sides of the saddle member 25 and has fixed thereto a pair of operating cranks 58 and 59, which are disposed respectively laterally outwardly of the member side elements 26 and 27. The apertured ears 38 and 39 provide bearing means for carrying a transverse shaft 60 which, through a sprocket and chain connection 61, drives a short parallel shaft 62 journaled in brackets 63 that are mounted on the top wall 20 of the bale case, this latter structure being the only part of the tying mechanism that is not carried entirely on the saddle member 25. The forward portions of the side elements 26 and 27 are respectively provided with mounting portions 64 and 65 (Figure 3) on which is carried a housing 66, this housing having ears 67 and 68, respectively, carried on the mounting portions 64 and 65 by means of bolts 69 and 70 (Figure 1). That portion of the bale case top wall 20 immediately below the housing 66 is open, as indicated generally by the numeral 71 in Figure 1, this opening being provided for the purpose of feeding wire or twine into the baling chamber by feeding means carried by the housing 66 and including internal portions (not shown) and external portions including a pair of pinions 72 and a gear segment 73, an understanding of the details of the structure and operation of which is not necessary to an understanding of the present invention, the structure being illustrated merely to show how it is mounted on the saddle member 25. The numerals 74 indicate a pair of tubular wire guides for directing wire or twine (not shown) to the mechanism within the housing 66.

The transverse shaft 57 is chain-driven by means of a sprocket and chain mechanism, indicated generally by the numeral 75, just inwardly of the cam 59. An appropriate shield 76 is provided for enclosing a substantial portion of the chain drive means.

Although the saddle member 25 illustrated here is based upon a design permitting the use of this member as an accessory or attachment for existing balers and is especially adapted to carry the tying mechanism illustrated, it will be appreciated that changes may be made in the design thereof for the purposes of adapting it to other balers and other types of tying mechanism.

In the type of baler illustrated, and in other conventional balers, the tying mechanism cooperates with a needle that moves alternately in and out of the bale chamber through an opening in the bottom of the bale case. The bottom opening in the present instance is indicated by the numeral 80 and is best shown in Figures 5, 6 and 8. The needle is carried on a needle frame, indicated generally by the numeral 81, which preferably comprises a bail having a transverse portion 82 and a pair of arms 83 and 84. The upper end of the arm 84 is provided with pivot means including a bearing or sleeve 85 (Figures 5 and 9) carried by the pivot pin 50 of the bracket 48, the structure thus providing a combined mounting means for carrying the needle frame arm 84 and the saddle member 25, the latter through the medium of the depending arm or part 31. The other needle frame arm 83 is similarly carried at the opposite side of the bale case by the bracket and pivot means 51 (Figure 1). The needle frame is thus carried by the bale case structure for swinging about a transverse axis through the aligned carrying means 50 and 51.

The transverse part 82 of the needle frame 81 carries a pair of parallel needles 86 and 87, which may be of any conventional construction and which are arranged to move into and out of the bale case through the bottom opening 80 as the needle frame 81 pivots about its transverse axis as aforesaid. The purpose of the needle is to carry the lower strand of twine or wire to the tying mechanism, as is conventional. Figure 4 illustrates that the needle is provided with a pair of small pulleys 88 and a larger pulley 89 about which a strand of wire or twine, as at 90, is trained. The pulleys 88 carry the wire 90 up into the bale case, in the usual or well known manner. The wire or twine is supplied to the needle by dispensing mechanism (not shown), the wires being trained over a pair of laterally spaced pulleys 91 carried on brackets 92 secured to a transverse carrier member 93. The latter member is generally of U shape (Figure 6) and is rigidly secured to the bale case preferably by means of being welded to the bottom wall 21 and opposite side walls 22 and 23. The oscillating movement of the needle assembly about the transverse axis through the pivot or mounting members 50 and 51 is effected by the cranks 58 and 59, these cranks being respectively connected by pitmans 95 and 96 to the needle frame arms 83 and 84.

In prior constructions the bale case bottom was provided with a pair of slots for respectively receiving the free ends of the needles, and in many cases it was found that flexing of the bale case would distort these slots to an extent sufficient to permit the wire or twine to escape from the needles and become wedged between the needles and portions of the bale case bottom. According to the present invention, this possibility is eliminated by the provision of a rigid and unitary support providing a needle guide member which positively guides the needles 86 and 87 into and out of the bale case. The needle guide member or support is best shown by itself in Figure 7 and is indicated in its entirety by the numeral 100. This member includes a main body portion of flat or plate-like construction, although preferably formed as a casting. The main body is provided at one end with a mounting ear 101 which has single aperture 102 formed therein. The opposite end of the member has a mounting ear 103 which is apertured in two places, as at 104. When the member 100 is installed in place over or within the opening 80 in the bale case bottom wall 21, the mounting ear 103 is mounted on the transverse carrier element 93, previously described, the latter having a pair of apertures 105 cooperable with the apertures 104 to receive a pair of bolts 106 (Figure 5). The mounting ear 101 serves as means for supporting the member 100 on a second transverse carrier element 107 spaced from the member 93 longitudinally of the bale case, the member 107 having an aperture 108 cooperable with the aperture 102 in the ear 101 to receive a securing means in the form of a bolt 109. The member 100 is thus rigidly carried by the bale case through the medium of the transverse carrier members 93 and 107, the latter serving to reenforce that portion of the bale case bottom wall in the immediate vicinity of the opening 80.

One side of the main body portion of the member 100 is so constructed as to include a longitudinal recess 110 which is parallel to the general longitudinal extent of the bale case. The other side of the member is provided with a similar longitudinal recess 111.

Opposite sides of the member 100 respectively carry members in the form of longitudinal strips 112 and 113. The strips 112 and 113 are respectively spaced laterally outwardly from side portions of the member 100 and are respectively longitudinally recessed at 114 and 115 to provide means cooperating with the recesses 110 and 111 to provide longitudinal slots 116 and 117 respectively receiving the needles 86 and 87. The means by which the strip members 112 and 113 are spaced in the aforesaid manner to provide the slots 116 and 117 include a pair of mounting portions 118 and 119 respectively at that end of the member 100 which is provided with the mounting ear 101. The opposite end of the member is provided with a pair of spacers 120 and 121. The mounting portion 118 and spacer 120 cooperate with bolts 122 and shims 123 to provide means for rigidly but adjustably carrying the strip member 112 on the main body of the member 100. Bolts 124 and shims 125 are provided at the other side of the member 100 for similarly mounting the side member or strip 113. By means of the construction just described, the elements defining the slots 116 and 117 are rigidly related and are not affected by flexing of the bale case. Consequently, the adjustment of the slot 116 to accommodate the needles 86 and 87, respectively, can be made sufficiently close to guard against the wire slipping off the pulley 88 and becoming wedged between the needles and portions of the member 100. Further, inasmuch as the member 100 is, together with its side strips 112 and 113, of unitary construction, it may be readily removed and replaced.

The opposite side portions of the main body of the member 100 are apertured at 130 for the purpose of carrying hay dogs or equivalent retainers, which are not shown since they may be of any conventional construction. The transverse portion of the main body of the member 100 is lightened by an opening 131 and is further apertured at 132 and 133 for the purpose of accommodating the hay dogs as mentioned above.

The function of the saddle member 25 in imparting rigidity to the bale case is complementary to that of the needle guide member 100, inasmuch as the depending arms 30 and 31 of the former serve as mounting means for the needle frame 81 and eliminate the likelihood of the effect of bale case distortion on the needle frame, thus maintaining the general alignment of the needle frame so that the needles 86 and 87 may be efficiently guided by the slots 116 and 117 in the needle guide member 100.

What is claimed is:

1. For a baling press having a generally rectangular bale case provided with tying mechanism at the top thereof and with a vertically swingable needle entering the case from below: a saddle-like structural member having a transverse upper part for disposition across the top of the bale case and having a connecting portion to be secured to the bale case and a mounting portion for carrying the tying mechanism, and a pair of depending parts rigidly joined to the transverse part and spaced apart to receive the bale case therebetween with said depending parts respectively disposed at opposite sides of the bale case, each of said depending parts including a connecting portion to be secured to the bale case and the connecting portion of at least one of said depending parts serving as a mounting element for carrying the needle.

2. For a baling press having a generally rectangular bale case provided with tying mechanism at the top thereof and with a vertically swingable needle entering the case from below: said needle having transversely spaced apart pivot portions; a saddle-like structure member having a transverse upper part for disposition across the top of the bale case and having a connecting portion to be secured to the bale case and a mounting portion for carrying the tying mechanism, and a pair of depending parts rigidly joined to the transverse part and spaced apart to receive the bale case therebetween with said depending parts respectively disposed at opposite sides of the bale case, each of said depending parts including a connecting portion to be secured to the bale case and the connecting portions of said depending parts each having a pivot portion and said pivot portions being transversely spaced apart to cooperate with the needle pivot portions.

3. For a baling press having a generally rectangular bale case provided with tying mechanism at the top thereof and with a vertically swingable needle entering the case from below, said needle having transversely spaced apart pivot portions: a saddle-like structural member having a transverse upper part for disposition across the top of the bale case and having a connecting portion to be secured to the bale case and a mounting portion for carrying the tying mechanism, and a pair of depending parts rigidly joined to the transverse part and spaced apart to receive the bale case therebetween with said depending parts respectively disposed at opposite sides of the bale case, each of said depending parts having a combined mounting and connecting portion, said portions being transversely spaced apart to accommodate the needle pivot portions and to be secured to the bale case.

4. In a baling press: an elongated, relatively flexible bale case of sheet metal construction or the like and generally rectangular in cross section to include opposite side walls and top and bottom walls; means providing an opening in the top wall; means providing an opening in the bottom wall; a rigid support mounted on the bale case and having a transverse part lying across the top wall proximate to the opening therein, and a pair of laterally spaced apart depending parts lying respectively along opposite side walls of the case; means securing an intermediate portion of the transverse part to the bale case at a single point of connection; means securing each depending part to the bale case at a single point of connection; tying mechanism carried by the transverse part in proximity to the top wall opening; and a needle pivotally associated with the depending parts for swinging upwardly through the bottom wall opening.

5. In a baling press: an elongated, relatively flexible bale case of sheet metal construction or the like and generally rectangular in cross section to include opposite side walls and top and bottom walls; means providing an opening in the top wall; means providing an opening in the bottom wall; a rigid support mounted on the bale case and having a transverse part lying across the top wall proximate to the opening therein, and a pair of laterally spaced apart depending parts lying respectively along opposite side walls of the case; means securing an intermediate portion of the transverse part to the bale case at a single point of connection; means securing each depending part to the bale case at a single point of connection, said last named means being laterally spaced apart and including pivots alined on an axis transverse to the bale case; and a needle swingably carried by the alined pivots for swinging upwardly through the bottom opening.

6. In a baling press: an elongated, relatively flexible bale case of sheet metal construction or the like and generally rectangular in cross section to include opposite side walls and top and bottom walls; means providing an opening in the top wall; a rigid support mounted on the bale case and having a transverse part lying across the top wall proximate to the opening therein, and a pair of laterally spaced apart depending parts lying respectively along opposite side walls of the case; means securing an intermediate portion of the transverse part to the bale case at a single point of connection; means securing each depending part to the bale case at a single point of connection; and tying mechanism carried by the transverse part in proximity to the top wall opening.

7. In a baling press: an elongated, relatively flexible bale case of sheet metal construction or the like and generally rectangular in cross section to include opposite side walls and top and bottom walls; means providing an opening in the top wall; a rigid support mounted on the bale case and having a transverse part lying across the top wall proximate to the opening therein, and a pair of laterally spaced apart depending parts lying respectively along opposite side walls of the case; means securing an intermediate portion of the transverse part exclusively to the top wall of the bale case at a single point of connection; means securing each depending part exclusively to the respective side wall of the bale case at a single point of connection; and tying mechanism carried by the transverse part in proximity to the top wall opening.

8. In a baling press: an elongated, relatively flexible bale case of sheet metal construction or the like and generally rectangular in cross section to include opposite side walls and top and bottom walls; means providing an opening in the top wall; a rigid support mounted on the bale case and having a transverse part lying across the top wall proximate to the opening therein, and a pair of laterally spaced apart depending parts lying respectively along opposite side walls of the case; means securing an intermediate portion of the transverse part exclusively to the top wall of the bale case; means securing each depending part exclusively to the respective side wall of the bale case; and tying mechanism carried by the transverse part in proximity to the top wall opening; and a needle pivotally associated with the depending parts for swinging upwardly through the bottom wall opening.

9. In a baling press: an elongated, relatively flexible bale case of sheet metal construction or the like and generally rectangular in cross section to include opposite side walls and top and bottom walls; means providing an opening in the bottom wall; a longitudinally and transversely rigid support carried by the top wall and both side walls of the bale case proximate to the opening therein; tying mechanism carried by said support independently of the bale case walls; a second longitudinally and transversely rigid support carried by the bottom and side walls of the bale case and including relatively rigid parts spaced apart to provide a needle guide opening; and a needle movably mounted on the first support for movement through said guide opening.

10. In a baling press: an elongated relatively flexible bale case of sheet metal construction or the like and generally rectangular in cross-section to include top and bottom walls and opposite side walls; means providing an opening through the bottom wall; a pair of transverse carrier members spaced longitudinally apart respectively at opposite ends of the opening and rigidly secured to bottom wall of the case, at least one of said members being extended transversely at each end and rigidly secured to the bale case side walls; and a rigid needle-guide element disposed across the opening and rigidly secured to the carrier members, said element having a pair of relatively rigid portions spaced apart to provide a needle guide opening for a tying needle.

11. For a baling press having an elongated relatively flexible bale case including top and bottom and opposite side walls: a support comprising a rigid generally open frame for disposition across one of the bale case walls and made up of rigidly joined opposite side and end elements, and a pair of arm portions rigidly joined respectively to a pair of opposite elements to extend respectively at least partially across other walls of the bale case, at least one of said elements and each of said arm portions being provided with mounting portions for securing the support to the bale case.

12. A support as defined and for the purposes set forth in claim 11, further characterized in that: the support is thickened and reenforced at the junctions of the arm portions and the elements from which said arm portions extend, and said thickened portions are recessed to provide pockets therein.

13. For a baling press having an elongated bale case provided with a wall having an opening therethrough and a needle mounted for movement through the opening into and out of the bale case: a needle guide comprising a generally rectangular plate-like main body member positionable in the opening flush with the interior of said wall and having mounting portions thereon to be secured to the bale case, means respectively at opposite sides of said member providing elongated generally parallel recesses, and a pair of side members disposed respectively at the sides of the body member and respectively cooperable with the recesses to provide a pair of parallel slots to receive needle portions, and means rigidly and adjustably securing the side members to the main body member for individual adjustment laterally of the slots to vary the width of said slots.

14. A needle guide for the purposes and as defined in claim 13, in which: each side member is itself provided with an elongated recess cooperable with the proximate main body recess to provide the elongated guide slot, and the adjustment is accomplished by means of shims interposed between the main body member and the respective side member.

15. In a baling press: an elongated relatively flexible bale case of sheet metal construction or the like and generally rectangular in cross-section to include top and bottom walls and opposite side walls; means providing in the bottom wall an opening having longitudinally spaced-apart opposite ends; a pair of relatively rigid, transverse reenforcing members spaced apart longitudinally and disposed across the bottom wall respectively at opposite ends of the opening and rigidly secured to the case; and a longitudinally and transversely rigid needle guide member disposed over the opening and having longitudinally spaced-apart opposite ends rigidly secured respectively to the carrier members.

16. In a baling press having a bale case of rectangular construction provided with a bottom opening and including a needle movable upwardly through the opening and into the case: a needle guide structure for mounting on the bale case bottom across the opening and comprising a main rigid body having mounting portions to be secured to the bale case bottom and provided at one side with an elongated recess, a rigid secondary member disposed alongside the main body and having an elongated recess cooperable with the body recess to provide an elongated guide slot for the needle, and means rigidly and adjustably securing the secondary member to the main body to provide for selectively varying the transverse dimension of the guide slot.

17. In a baling press having a bale case of rectangular construction provided with a bottom opening and including a needle structure having a pair of laterally spaced apart needles movable in parallel paths upwardly through the opening and into the case: needle guide structure for mounting on the bale case bottom across the opening and comprising a main rigid body having mounting portions to be secured to the bale case bottom and having opposite parallel side portions, each of which has an elongated recess, a pair of rigid members disposed respectively along opposite side portions of the main body and each having an elongated recess cooperable with the proximate body recess to provide a pair of parallel guide slots for the needles, and means rigidly and adjustably securing each member to the respective side portion of the main body to provide for selectively varying the transverse dimension of the respective guide slot.

18. In a baling press having a bale case of rectangular construction provided with a bottom opening and including a needle structure having a pair of laterally spaced apart needles movable in parallel paths upwardly through the opening and into the case: needle guide structure for mounting on the bale case bottom across the opening and comprising a main rigid body having mounting portions to be secured to the bale case bottom and having opposite parallel side portions, each of which has an elongated recess, a pair of rigid members disposed respectively along opposite side portions of the main body and cooperable respectively with the body recesses to provide a pair of parallel guide slots for the needles, and means rigidly and adjustably securing each member to the respective side portion of the main body to provide for selectively varying the transverse dimension of the respective guide slot.

19. In a baling press: an elongated, relatively flexible bale case of sheet metal construction or the like and generally rectangular in cross section to include opposite side walls and top and bottom walls; said top wall and said bottom wall each having an opening therein; a rigid support mounted on the bale case and having a transverse part lying across the top wall proximate to the opening therein, and a pair of laterally spaced apart depending parts lying respectively along opposite side walls of the case; means securing an intermediate portion of the transverse part exclusively to the top wall of the bale case; means securing each depending part exclusively to the respective side wall of the bale case; and tying mechanism carried by the transverse part in proximity to the top wall opening; and a needle pivotally associated with the depending parts for swinging upwardly through the bottom wall opening.

GEORGE B. HILL.
MARCUS E. McCLELLAN.

REFERENCES CITED

The following references are of record in the file of this patent:

UNITED STATES PATENTS

| Number | Name | Date |
|---|---|---|
| 659,792 | Denny | Oct. 16, 1900 |
| 761,305 | Johnson | May 31, 1904 |
| 2,403,396 | Raney | July 2, 1946 |
| 2,446,878 | Kaupke et al. | Aug. 10, 1948 |

Certificate of Correction

Patent No. 2,558,250

June 26, 1951

GEORGE B. HILL ET AL.

It is hereby certified that error appears in the printed specification of the above numbered patent requiring correction as follows:

Column 9, line 38, beginning with "In a baling press: an elongated," strike out all to and including "bottom wall opening." in line 55, and insert instead the following:

*In a baling press: an elongated, relatively flexible bale case of sheet metal construction or the like and generally rectangular in cross section to include opposite side walls and top and bottom walls; means providing an opening in the top wall; means providing an opening in the bottom wall; a longitudinally and transversely rigid support carried by the top wall of the bale case proximate to the opening therein; tying mechanism carried by said support independently of the bale case walls; a second longitudinally and transversely rigid support carried by the bottom wall of the bale case and including relatively rigid parts spaced apart to provide a needle guide opening; and a needle movably mounted on one of said supports for movement through said guide opening.* and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*